United States Patent
Tsai et al.

(10) Patent No.: US 8,009,065 B2
(45) Date of Patent: Aug. 30, 2011

(54) SYSTEM AND METHOD FOR ENCODING AND DECODING SERIAL SIGNALS FORMED BY A PLURALITY OF COLOR LIGHTS

(75) Inventors: Hsing-An Tsai, Xinhua Township, Tainan County (TW); Kai-Hsiang Hsu, Tucheng (TW); Yu-Hsin Wang, Guishan Township, Taoyuan County (TW); Jia-Zong Chen, Taoyuan (TW)

(73) Assignee: Marketech International Corp., Taipei (TW)

( * ) Notice: Subject to any disclaimer, the term of this patent is extended or adjusted under 35 U.S.C. 154(b) by 0 days.

(21) Appl. No.: 12/591,769

(22) Filed: Dec. 1, 2009

(65) Prior Publication Data

US 2011/0090099 A1  Apr. 21, 2011

(30) Foreign Application Priority Data

Oct. 20, 2009  (TW) ................................ 98135375 A

(51) Int. Cl.
*H03M 7/00* (2006.01)
*H03K 11/00* (2006.01)

(52) U.S. Cl. ........................................... 341/50; 341/20

(58) Field of Classification Search ..................... 341/50, 341/22, 23, 33
See application file for complete search history.

(56) References Cited

U.S. PATENT DOCUMENTS 6,005,508 A * 12/1999 Tsui ............................... 341/173
7,606,429 B2 * 10/2009 Aleksic et al. ................. 382/232

* cited by examiner

*Primary Examiner* — Peguy JeanPierre
(74) *Attorney, Agent, or Firm* — Bacon & Thomas, PLLC

(57) ABSTRACT

The present invention is to provide a method for encoding and decoding serial signals formed by a plurality of color lights, which is applied to an encoding/decoding system comprising an encoding device and a decoding device, and comprises steps of generating a driving signal corresponding to at least one first serial code set by the encoding device, so as to drive a multi-color LED to generate a plurality of color lights having different wavelengths and interval time of flash intervals; and receiving the color lights by the decoding device, decoding the color lights according to a decoding procedure of the decoding device for obtaining the first serial code set, and sending an actuation signal when determining that the first serial code set is identical to a second serial code set, so as to provide a variety of more sophisticated, safer and uneasy interfered encoding/decoding functions to various wireless control procedures.

15 Claims, 6 Drawing Sheets

SYSTEM AND METHOD FOR ENCODING AND DECODING SERIAL SIGNALS FORMED BY A PLURALITY OF COLOR LIGHTS

FIELD OF THE INVENTION

The present invention relates to an encoding and decoding system, more particularly to a system capable of encoding and decoding serial signals formed by a plurality of color lights, so as to provide a variety of sophisticated encoding and decoding rules and procedures for the encoding and decoding system and enable the encoding and decoding system to be implemented to various control procedures for achieving more complicated, safer and uneasy interfered wireless control functions.

BACKGROUND OF THE INVENTION

Traditionally, many devices use encoding/decoding systems to carry out a wireless control function, such as infrared (IR) remote control devices, radio-frequency identification (RFID) systems and so on. The foregoing two encoding/decoding systems are described as follows:

(1) Infrared (IR) remote control device: Referring now to FIG. 1, an IR remote control device 1 comprises a transmitter 10 and a receiver 11. The transmitter 10 includes an encoding chip 100, a matrix type keyboard 101 and a light emitting diode (LED) 102, wherein the encoding chip 100 is electrically connected to the keyboard 101 and the LED 102, respectively. When a user presses the keyboard 101, the encoding chip 100 can determine which key of the keyboard 101 is pressed, and transmit a driving signal corresponding to the key to the LED 102 according to an encoding procedure stored in the encoding chip 100. Thus, the LED 102 can generate IR lights having different flash time intervals according to the driving signals. For example, "0" in binary code means that the LED 102 is turned on 0.56 ms and turned off 0.56 ms while "1" in binary code means that the LED 102 is turned on 0.56 ms and turned off 1.125 ms. The receiver 11 includes a demodulation chip 110, a photoelectric converter 111, a decoding circuit 112 and an application circuit 113, wherein the demodulation chip 110 is electrically connected to the photoelectric converter 111 and the decoding circuit 112, respectively. After the photoelectric converter 111 receives IR lights emitted by the LED 102, the photoelectric converter 111 converts the IR lights into electrical signals in turns, and transmits the electrical signals to the demodulation chip 110. Thus, the demodulation chip 110 can process the electrical signals in turn to determine binary codes of the electrical signals, and converts codes of a predetermined bits into a serial code. For example, a predetermined "32 bits" means that 32 binary codes are included. The decoding circuit 112 is further electrically connected to the application circuit 113. When the decoding circuit 112 receives the serial code, the decoding circuit 112 decodes the serial code to obtain a control signal, and transmits the control signal to the application circuit 113. As a result, the application circuit 113 can execute a control procedure of an electronic machine or an electric device according to the control signal, such as to open or close a power door, an electric lock, a security system or a household appliance.

However, as described above, the IR remote control device 1 only uses the duration of light and dark of IR lights to encode. Thus, an illegal user may easily find out the emitting rule of the IR remote control device 1 and obtain related codes. Thus, if the user uses the IR remote control device 1 to control or execute a security system, it cannot provide the best security effect. Meanwhile, the safety of the user and the property thereof may be endangered because the codes of the IR remote control device 1 is cracked and stolen.

(2) Radio-frequency identification (RFID) system: Referring now to FIG. 2, the RFID system 2 comprises a reader 20 and an electrical tag 21. The reader 20 and the electrical tag 21 can transmit and receive radio signals of a predetermined frequency with each other, wherein the reader 20 can be electrically connected to an electronic machine or an electrical equipment, and the reader 20 includes a first controller 200 and a first transceiver antenna 201, and the first controller 200 is electrically connected to the first transceiver antenna 201 and uses the first transceiver antenna 201 to continuously send a radio signal. The electrical tag 21 includes a second transceiver antenna 210, a demodulation unit 211 and a second controller 212, wherein the demodulation unit 211 is electrically connected to the second transceiver antenna 210 and the second controller 212, respectively. When the second transceiver antenna 210 receives the radio signal, the second transceiver antenna 210 transmits the radio signal to the demodulation unit 211, and the demodulation unit 211 demodulates the radio signal into an operational power, and supplies the operational power to second controller 212. Thus, the second controller 212 can work under the supply of the operational power. Meanwhile, the second controller 212 transmits a code pre-stored therein to the demodulation unit 211, and the demodulation unit 211 demodulates the code into another radio signal which will then be transmitted back to the reader 20. As a result, the reader 20 can obtain the code stored in the electrical tag 21 from the radio signal, and the first controller 200 can execute a control procedure of the electronic machine or the electrical equipment according to the code.

As described above, only if the reader 20 and the electrical tag 21 have the same transmitting and receiving frequency, the reader 20 can obtain the codes stored in the electrical tag 21. Thus, when the predetermined transmitting and receiving frequency of the reader 20 and the electrical tag 21 is cracked, the codes stored in the electrical tag 21 may be stolen. In addition, because the radio signal is easily interfered by electro-magnetic waves, the reader 20 may not work to successfully receive the codes when the reader 20 receives the codes in the electrical tag 21 in a case where there is interference of electro-magnetic waves (such as electro-magnetic waves generated by a mobile phone) in the environment around the reader 20. Even worse, the reader 20 may receive incorrect codes, which causes the malfunction of the electronic machine or the electrical equipment and endangers the safety of the user. Besides, because the radio signal of the RFID system 2 is easily interfered by the environmental electro-magnetic waves, the RFID system 2 can not be applied to wireless remote control of long distance. As a result, the application of the RFID system 2 can not be efficiently enhanced.

As a result, because there are several operational disadvantages existing in the IR remote control device 1, the RFID system 2 or other existing encoding/decoding systems, it is important for related manufacturers to think how to efficiently improve the disadvantages (such as poor security, low safety and frequent interference) of the foregoing various encoding/decoding systems applied to wireless control devices.

It is therefore tried by the inventor to develop a method and a system for encoding and decoding serial signals formed by a plurality of color lights to efficiently solve various problems existing in the conventional encoding/decoding systems as described above, so that the encoding/decoding systems can carry out more complicated, safer and uneasy interfered function of wireless control in various control procedures.

BRIEF SUMMARY OF THE INVENTION

An objective of the present invention is to provide a system for encoding and decoding serial signals formed by a plurality of color lights, which comprises an encoding device and a decoding device, wherein the encoding device has a first microcontroller unit and a first memory. The first microcontroller unit is used to read out a first serial code set (such as including a start code, a true password code and an end code) in the first memory, and generate control signals corresponding to each of the codes in the first serial code set. The encoding device further has a multi-color driving circuit and a multi-color light emitting diode (LED), wherein the multi-color driving circuit can receive the control signals, generate driving signals corresponding to the control signals, and transmit the driving signals to the multi-color LED, so that the multi-color LED can generate various color lights having different wavelengths and flash time intervals corresponding to different driving signals. The decoding device has a multi-color sensor, a second memory and a second microcontroller unit, wherein the multi-color sensor can detect the color lights emitted by the multi-color LED in turn, and generate detecting signals corresponding to the color lights. The second memory stores at least one second serial code set (such as a start code, a true password code and an end code) and a decoding procedure. The second microcontroller unit can receive the detecting signals, and decode the detecting signals via the decoding procedure, so as to obtain the first serial code set. Moreover, when the second microcontroller unit determines that the first serial code set is identical to the second serial code set, the second microcontroller unit sends an actuation signal to execute a control procedure of an electronic machine or an electric device (such as to open or close a power door, an electric lock, a security system, a household appliance, etc.). Therefore, because the encoding/decoding system uses the serial signals formed by a plurality of color lights to provide various more complicated and uneasy interfered encoding/decoding function, it can efficiently solve the foregoing problems of the traditional IR remote control device which only can identify a light source of single color, the wireless control function thereof is poor and the safety thereof is low, while it also can solve the foregoing problems of the traditional RFID system which only has radio signals of fixed frequency easily interfered by electro-magnetic waves and thus only can provide the code identification function of short distance.

Another objective of the present invention is to provide a method applied to the foregoing encoding/decoding system, wherein a designer can design various more complicated encoding/decoding rules and procedures for the encoding/decoding system, so that the encoding/decoding system can carry out more complicated, safer and uneasy interfered functions of wireless control in various control procedures for the purpose of solving various problems existing in the foregoing traditional IR remote control device and the traditional RFID system.

BRIEF DESCRIPTION OF THE SEVERAL VIEWS OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE INVENTION

Figure 1:
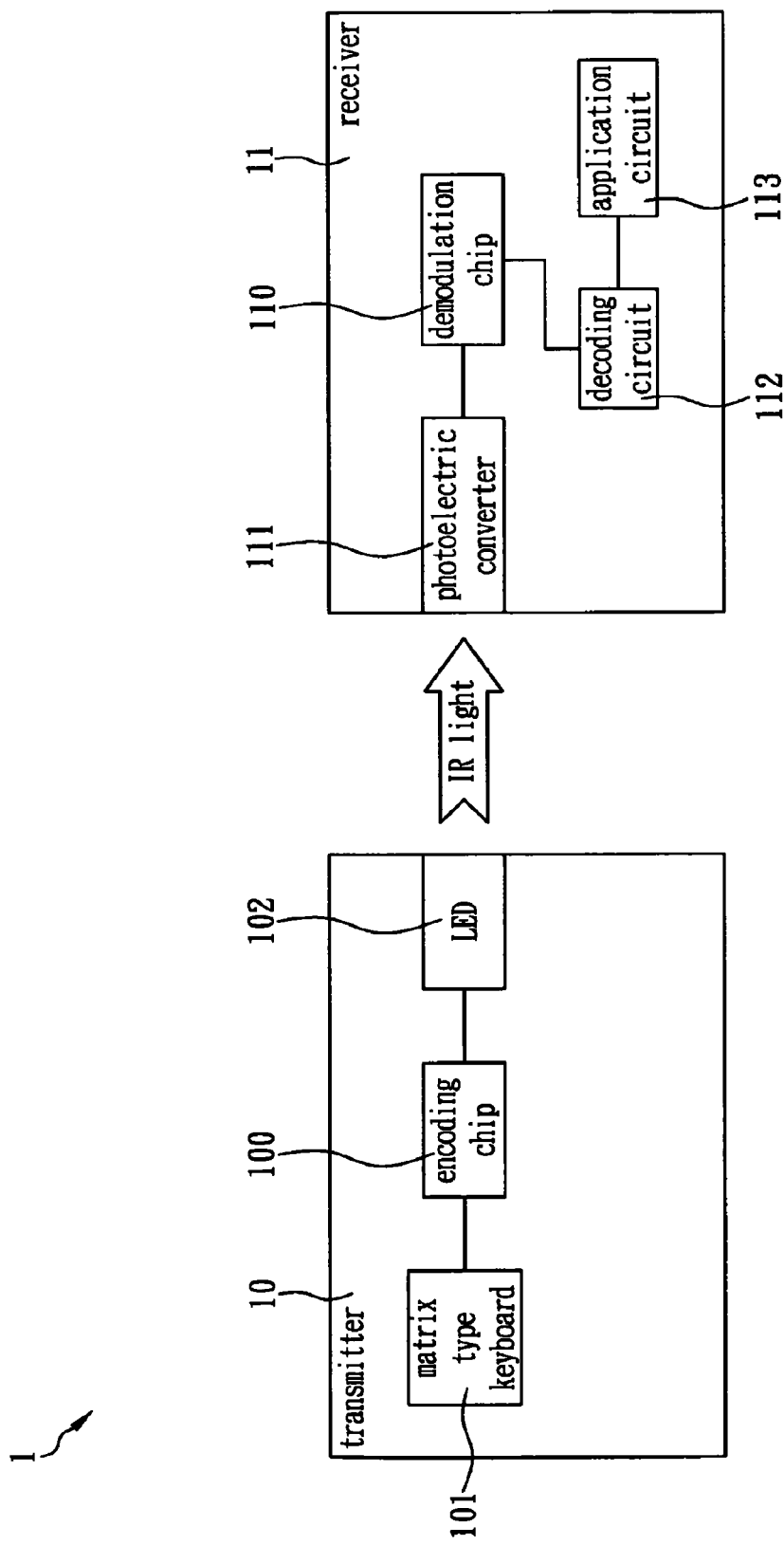
FIG. 1 is a block diagram of a traditional IR remote control device.
Figure 2:
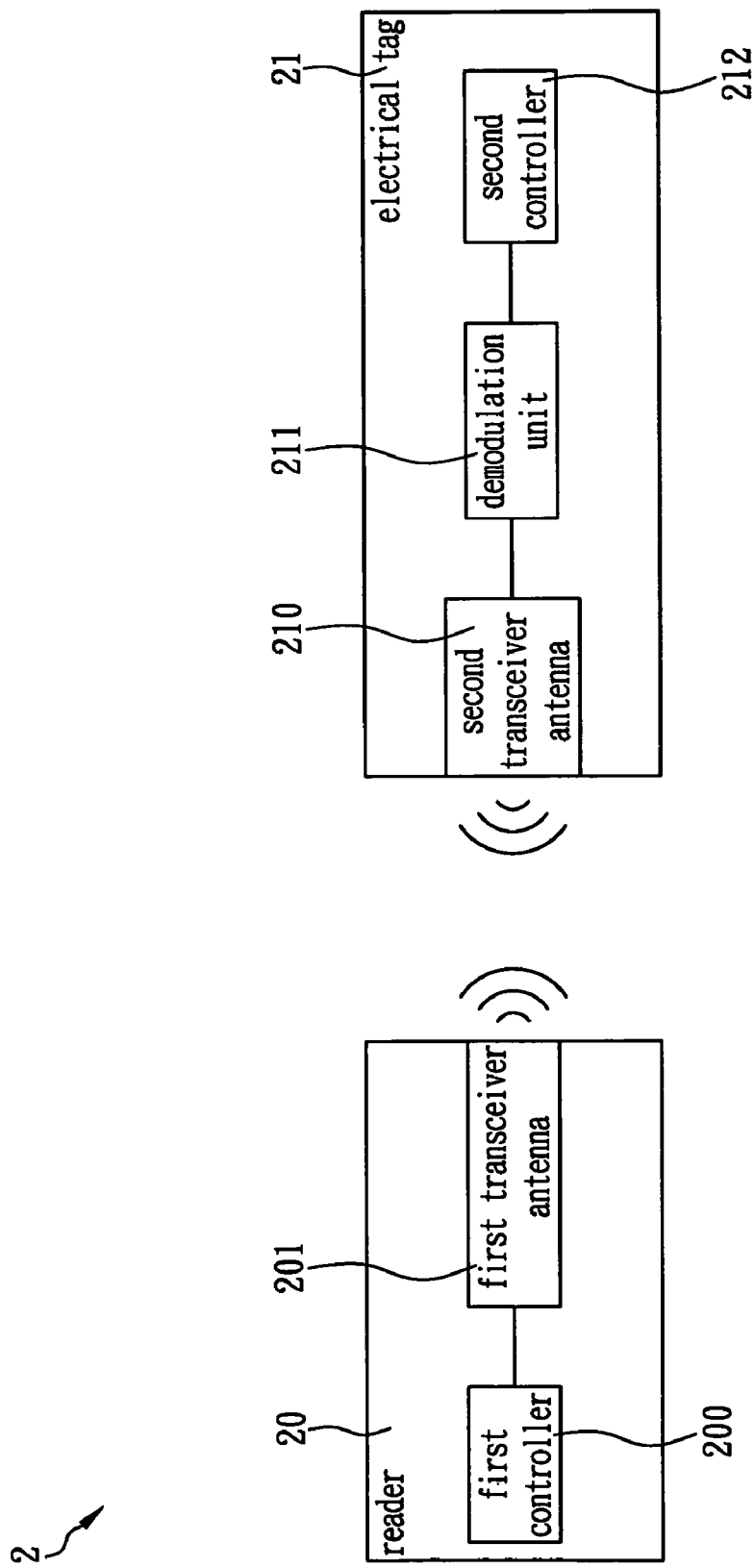
FIG. 2 is a block diagram of a traditional RFID system.

The present invention is a system and a method for encoding and decoding serial signals formed by a plurality of color lights. In a preferred embodiment of the present invention, referring now to FIG. 3, an encoding/decoding device 3 comprises an encoding device 30 which has a first memory 300, a first microcontroller unit (MCU) 301, a multi-color driving circuit 302 and a multi-color light emitting diode (LED) 303, wherein the first memory 300 stores at least one first serial code set which includes a start code, a true password code and an end code. The first MCU 301 electrically connected to the first memory 300 is used to read out the first serial code set, and then generates a control signal corresponding to each of the codes in the first serial code set. The multi-color driving circuit 302 electrically connected to the first MCU 301 can receive the control signal, and generate a driving signal corresponding to the control signal. The multi-color LED 303 electrically connected to the multi-color driving circuit 302 can receive the driving signal, and generate various color lights having different wavelengths and flash time intervals corresponding to different driving signals, wherein the color lights may be yellow light with 570-590 nm wavelength, orange light with 590-610 nm wavelength, red light with 610-760 nm wavelength, etc. For example, the multi-color LED 303 of the encoding device 30 can firstly emit purple light for 3 ms to define the start code, and then emit red light for 0.5 ms; or emit green light for 1 ms, yellow light for 1 ms and brown light for 1 ms in turn to define the true password code (such as number "312") and then emit orange light for 0.5 ms; or emit blue light for 2 ms to define the end code.

Furthermore; the encoding/decoding device 3 further comprises a decoding device 31 which has a multi-color sensor 310 (such as a sensor for detecting various color lights including red light, green light, blue light, etc.), a second memory 311, a second microcontroller unit (MCU) 312 and an application circuit 313, wherein the multi-color sensor 310 can detect the color lights emitted by the multi-color LED 303 in turn, and generate a detecting signal corresponding to the color lights. The second memory 311 stores at least one second serial code set and a decoding procedure, wherein the second serial code set has a start code, a true password code and an end code. The second MCU 312 is electrically connected to the multi-color sensor 310 and the second memory 311, respectively, and can receive the detecting signal generated by the multi-color sensor 310, so as to decode the detecting signal via the decoding procedure stored in the second memory 311. For example, when the multi-color sensor 310 firstly receives purple light for 3 ms and then receives red light for 0.5 ms, the multi-color sensor 310 generates a detecting signal representing a start signal, and then the second MCU 312 decodes the detecting signal to obtain the first serial code set. After this, the second MCU 312 determines if the first serial code set is identical to the second serial code set stored in the second memory 311. When the second MCU 312 determines that the first serial code set is identical to the second serial code set, the second MCU 312 sends an actuation signal. The application circuit 313 is electrically connected to the second MCU 312, and used to receive the actuation signal generated by the second MCU 312 for executing a control procedure of an electronic machine or an electric device (such as to open or close a power door, an electric lock, a security system, a household appliance, etc.) according to the actuation signal.

Therefore, because the encoding/decoding system 3 uses the serial signals formed by a plurality of color lights to encode and decode, a designer can design various more complicated encoding/decoding rules and procedures for the encoding/decoding system 3, so that the encoding/decoding system 3 can carry out more complicated, safer and uneasy interfered function of wireless control in various control procedures. As a result, the present invention can efficiently solve the foregoing problems of the traditional IR remote control device which only can identify a light source of single color, the wireless control function thereof is poor and the safety thereof is low, while the present invention also can solve the foregoing problems of the traditional RFID system which only has radio signals of fixed frequency easily interfered by electro-magnetic waves and thus only can provide the code identification function of short distance.

In the referred embodiment of the present invention, referring back to FIG. 3, each of the first memory 300 and the second memory 311 is preferably electrically erasable programmable read-only memory (EEPROM) which is non-volatile memories. Thus, the designer of the encoding/decoding system 3 can use a writing device (not-shown) to input a predetermined voltage into the first memory 300 and the second memory 311 to erase data stored therein, and write the first serial code set and the second serial code set with the decoding procedure into the first memory 300 and the second memory 311, respectively. If it is necessary to upgrade the serial codes and the decoding procedure, the foregoing steps will be repeated again to correspondingly write new serial codes and decoding procedure into the first memory 300 and the second memory 311. Therefore, the designer can upgrade the serial codes and the decoding procedure according to actual desires to maintain the high safety of the encoding/decoding system 3. In addition, after the design correspondingly writes the serial codes and the decoding procedure into the first memory 300 and the second memory 311, the serial codes and the decoding procedure are continuously stored in the first memory 300 and the second memory 311. As a result, a user can continuously uses the encoding/decoding system 3 to execute the control procedure of the electronic machine or the electric device without worrying about if the serial codes and the decoding procedure correspondingly stored in the first memory 300 and the second memory 311 are disappeared due to light irradiation or power interruption.

Figure 3:
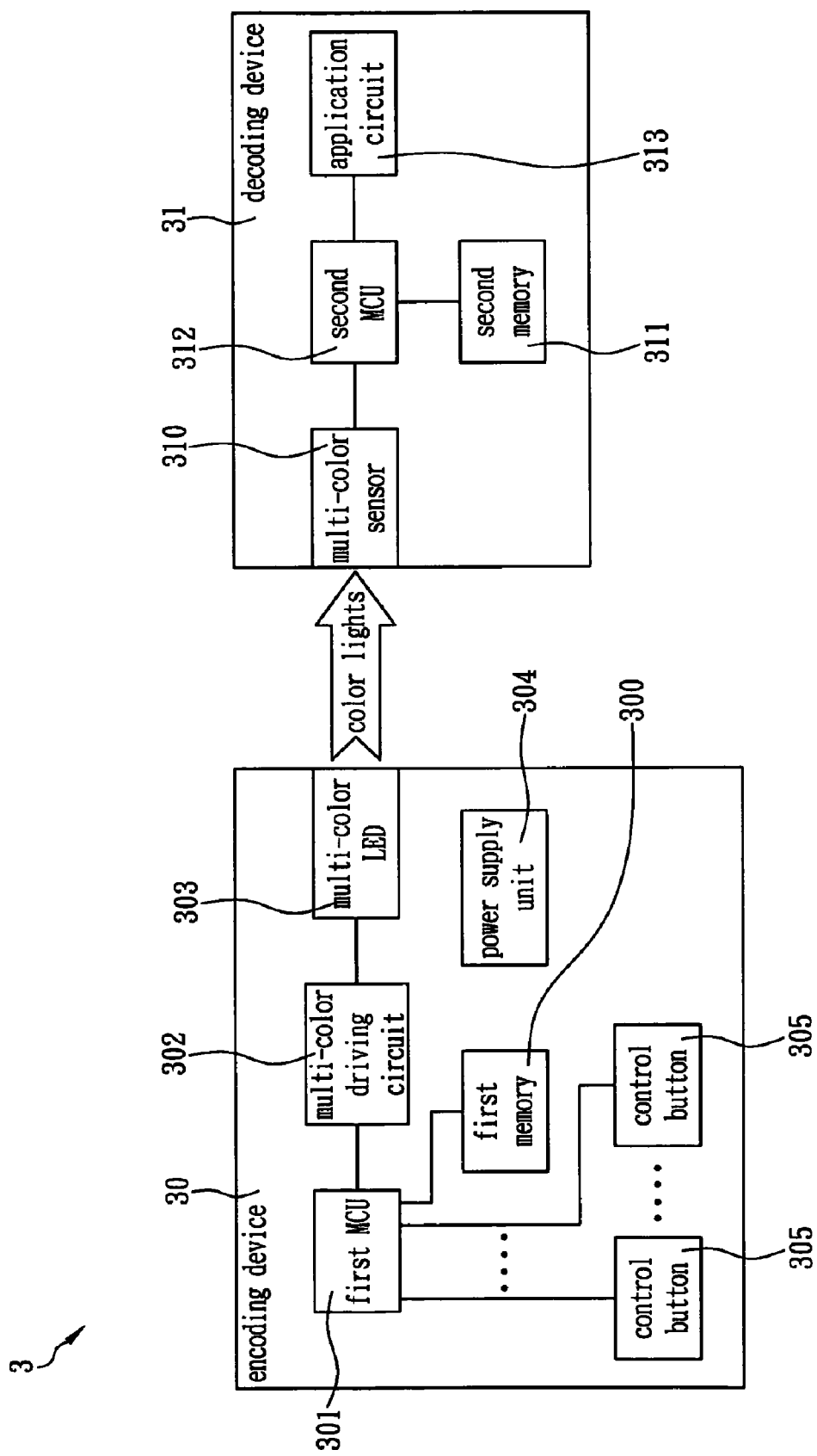
FIG. 3 is a block diagram of the encoding/decoding system according to a preferred embodiment of the present invention.

Moreover, referring still to FIG. 3, in the preferred embodiment of the present invention, each of the serial codes further has at least one random code, in order to prevent the true password code from being stolen, wherein each of the random code can be encoded before the start code or after the end code or at any position between the start code, the true password code and the end code according to actual design desires of the designer, so that the security and safety of the encoding/decoding system 3 can be substantially increased for efficiently lowering the cracked risk of the true password code.

In the preferred embodiment of the present invention, referring to FIG. 3 again, the encoding device 30 further comprises a power supply unit 304 and at least one control button 305, wherein the power supply unit 304 can supply an electric power to the first memory 300, the first MCU 301, the multi-color driving circuit 302 and the multi-color LED 303, so that the encoding device 30 can normally work, and the multi-color LED 303 can convert the electric power into light energy for efficiently emitting the color lights. Each of the control button 305 can be electrically connected to the first MCU 301 for controlling the emitting status (such as flash, dark, brightness, wavelength, color, etc.) of the multi-color LED 303 via the first MCU 301, so that the user can easily press each of the control button 305 to control the multi-color LED 303 to emit various different color lights with different wavelengths and flash time intervals for carrying out various control functions.

Figure 4:
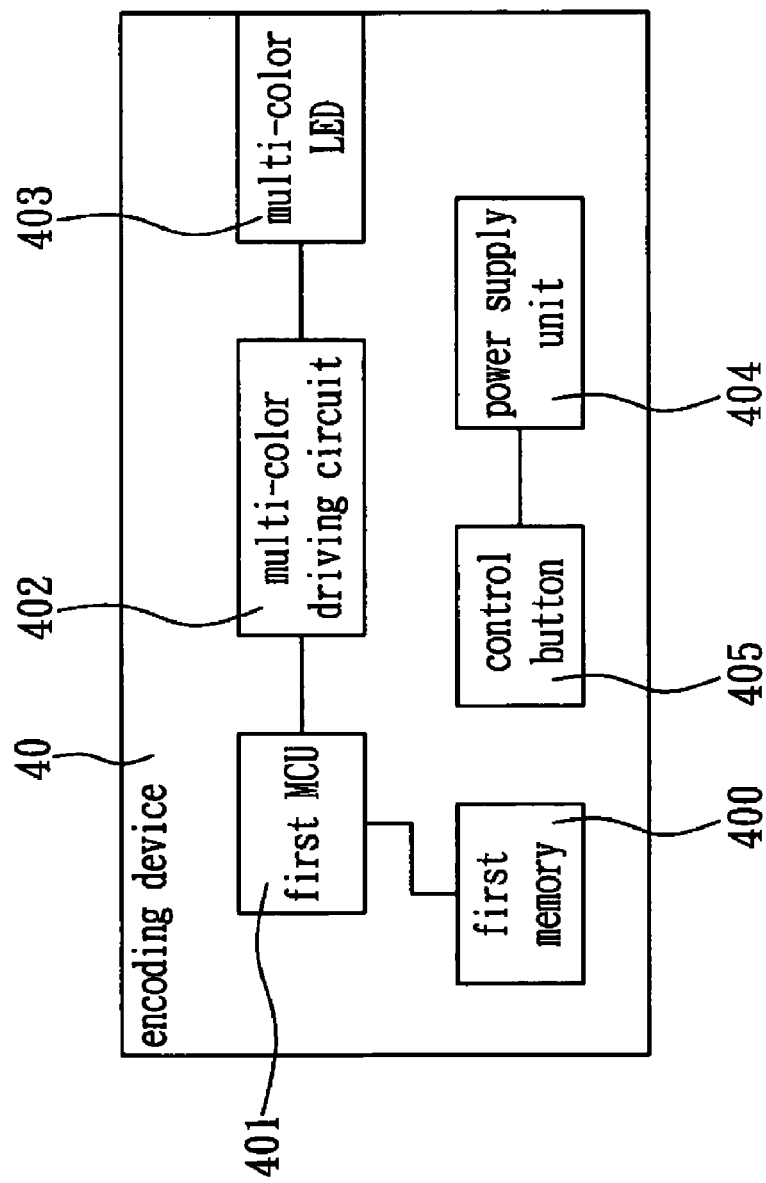
FIG. 4 is a block diagram of an encoding device according to another preferred embodiment of the present invention.

However, the connection relationship and function of the control button 305 are not limited to the foregoing embodiment. In another embodiment of the present invention, referring now to FIG. 4, an encoding device 40 comprises a control button 405 which is electrically connected to a power supply unit 404. When a user presses the control button 405, the control button 405 can switched off or switched on the electric power supplied to a first memory 400, a first microcontroller unit (MCU) 401, a multi-color driving circuit 402 and a multi-color light emitting diode (LED) 403 by the power supply unit 404. As a result, the consumed power of the encoding device 40 can be efficiently saved, so as to elongate the endurance of the encoding device 40.

Figure 5:
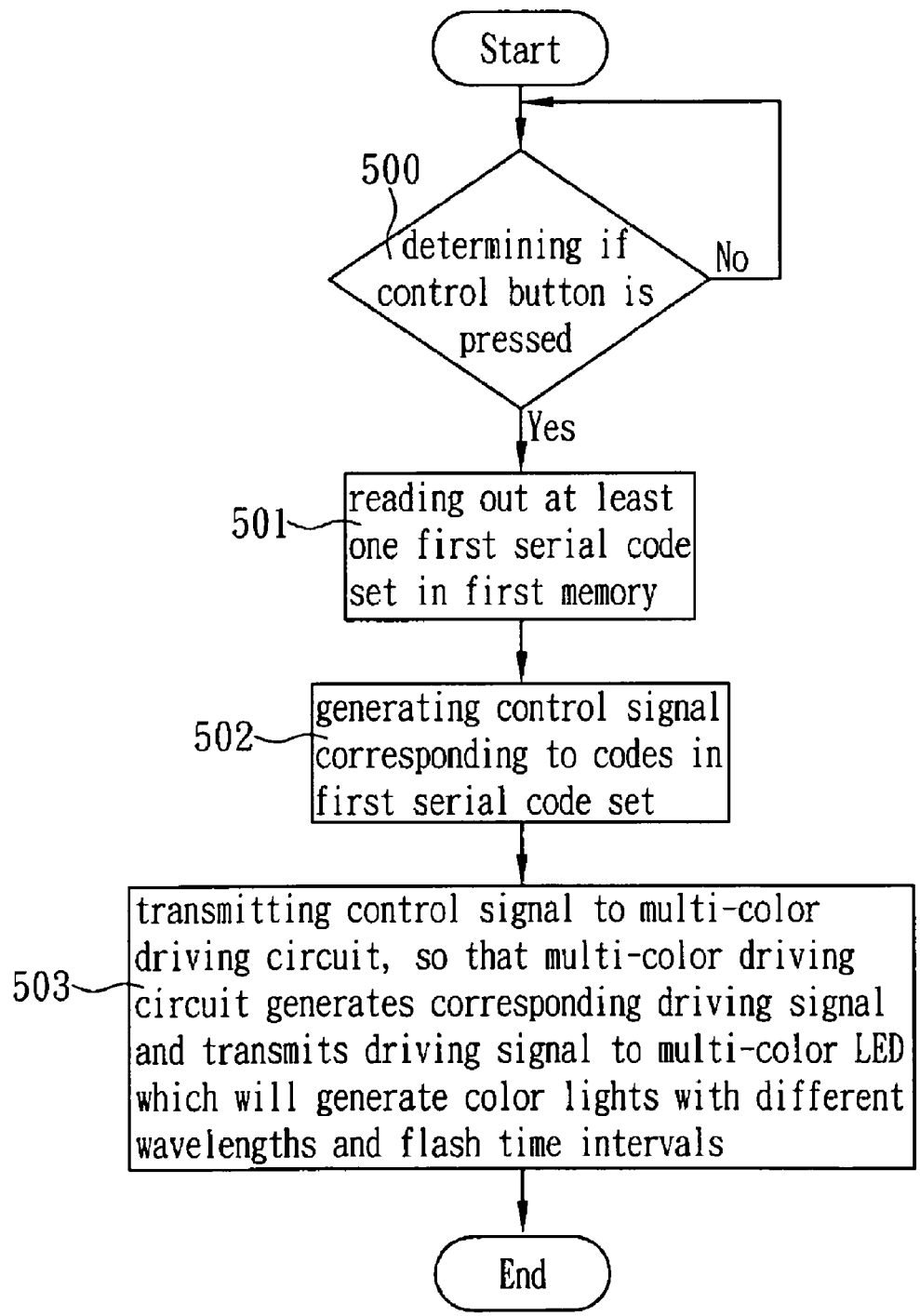
FIG. 5 is a flowchart of a method for encoding and decoding serial signals formed by a plurality of color lights according to a preferred embodiment of the present invention.

In addition, in the preferred embodiment of the present invention, referring now to FIGS. 3 and 5, a method applied to the encoding/decoding system 3 is illustrated and used to control the first MCU 301 of the encoding device 30 to execute the steps, as follows:

In a step (500), determining if the control button 305 is pressed; if yes, going to a step (501); and if not, repeating the step (500);

In a step (501), reading out at least one first serial code set in the first memory 300 when the control button 305 is pressed;

In a step (502), generating a control signal corresponding to each of codes in the first serial code set; and In a step (503), transmitting the control signal to the multi-color driving circuit 302, so that the multi-color driving circuit 302 generates a driving signal corresponding to the control signal and transmits the driving signal to the multi-color LED 303 which will generate color lights with different wavelengths and flash time intervals.

Figure 6:
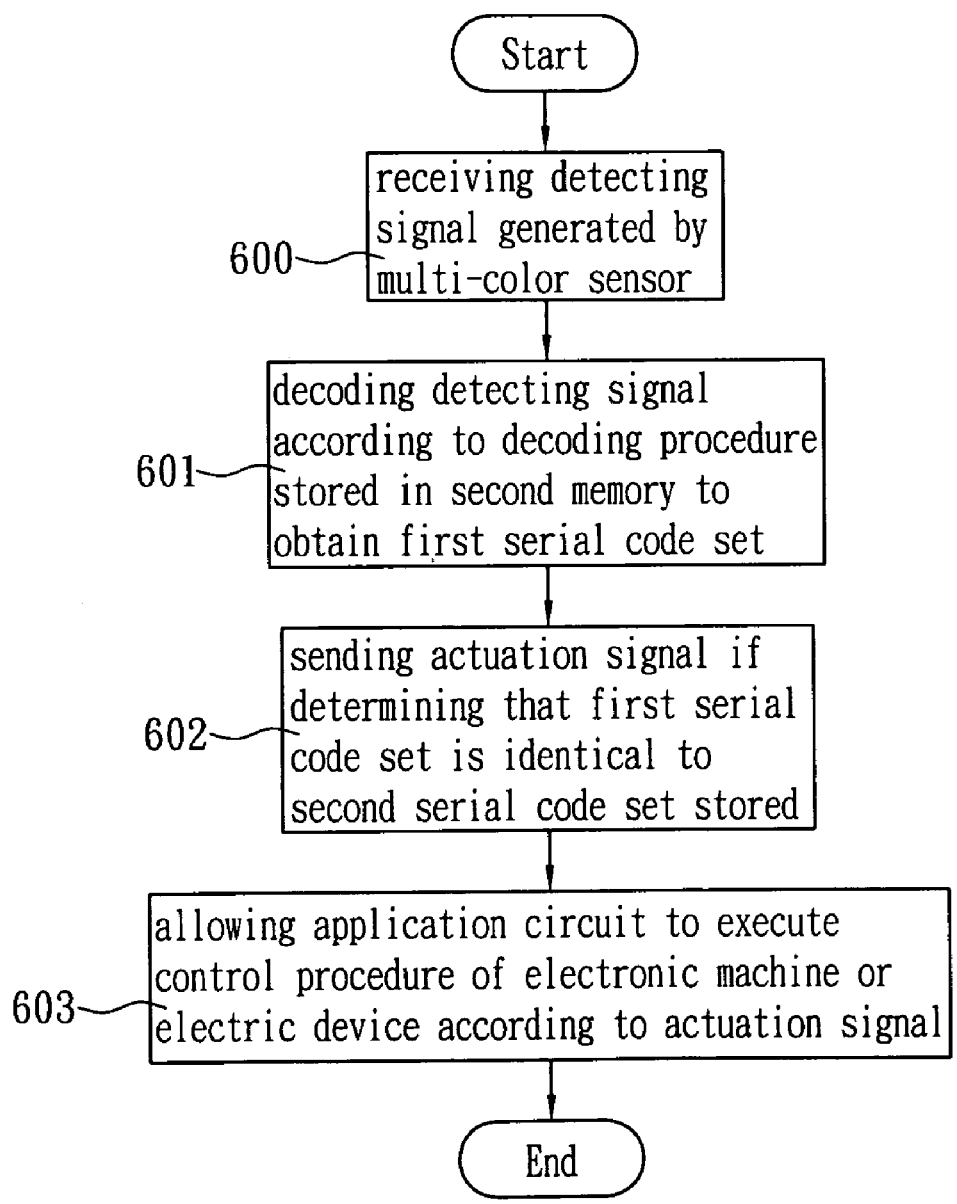
FIG. 6 is another flowchart of a method for encoding and decoding serial signals formed by a plurality of color lights according to a preferred embodiment of the present invention.

Moreover, in the preferred embodiment of the present invention, referring now to FIGS. 3 and 6, a method applied to the encoding/decoding system 3 is illustrated and used to control the second MCU 312 of the decoding device 31 to execute the steps, as follows:

In a step (600), receiving a detecting signal generated by the multi-color sensor 310 when the multi-color sensor 310 detects the color lights;

In a step (601), decoding the detecting signal according to a decoding procedure stored in the second memory 311, so as to obtain the first serial code set;

In a step (602), sending an actuation signal if determining that the first serial code set is identical to a second serial code set stored in the second memory 311; and In a step (603), allowing the application circuit 313 to receive the actuation signal and execute a control procedure of an electronic machine or an electric device according to the actuation signal.

Referring back to FIGS. 3 and 5, in the preferred embodiment of the present invention, for shortening and simplifying the procedures of each of the foregoing embodiments to enhance the execution efficiency of the encoding device 30, the step (500) as shown in FIG. 5 (i.e. the step of determining if the control button 305 is pressed) can be omitted, so that the first MCU 301 actively and continuously executes the steps (501) to (503). In the case, the first MCU 301 needs not execute any determination step, so that the operational loading of the encoding device 30 can be efficiently lowered. Besides, referring now to FIG. 6, a portion of the step (603) of allowing the application circuit 313 to execute the control procedure of the electronic machine or the electric device also can be omitted, i.e. the decoding device 31 simply executes a decoding step and needs not provide any application circuit 313, so as to efficiently save the design and manufacture cost of the circuits thereof.

As described above, referring to FIG. 3 again, in the present invention, a designer can design various more complicated encoding/decoding rules and procedures for the encoding/decoding system 3 by using color lights with different wavelengths and flash time intervals, so that the encoding/decoding system 3 can carry out more complicated, safer and uneasy interfered function of wireless control in various control procedures.

The present invention has been described with a preferred embodiment thereof and it is understood that many changes and modifications to the described embodiment can be carried out without departing from the scope and the spirit of the invention that is intended to be limited only by the appended claims.

What is claimed is:

1. A method for encoding and decoding serial signals formed by a plurality of color lights, applied to an encoding/decoding system comprising an encoding device and a decoding device, the method comprising steps of:
    generating a driving signal corresponding to at least one first serial code set by the encoding device, so as to drive a multi-color LED to generate a plurality of color lights having different wavelengths and flash time intervals; and
    receiving the color lights by the decoding device, decoding the color lights according to a decoding procedure of the decoding device for obtaining the first serial code set, and sending an actuation signal when determining that the first serial code set is identical to a second serial code set.

2. The method of claim 1, wherein the encoding/decoding system further comprises an application circuit, and the method further comprises a step of:
    allowing the application circuit to receive the actuation signal and execute a control procedure of an electronic machine or an electric device according to the actuation signal.

3. The method of claim 2, wherein the encoding device has a first microcontroller unit, a first memory, a multi-color driving circuit and the multi-color LED, and the method controls the first microcontroller unit of the encoding device to execute steps of:
    reading out the first serial code set from the first memory; and
    generating a control signal corresponding to each of codes in the first serial code set; and transmitting the control signal to the multi-color driving circuit, so that the multi-color driving circuit generates the driving signal corresponding to the control signal.

4. The method of claim 3, wherein the decoding device has a second microcontroller unit, a multi-color sensor and a second memory, and the method controls the second microcontroller unit to execute steps of:
    receiving a detecting signal generated by the multi-color sensor when the multi-color sensor detects the color lights; and
    decoding the detecting signal according to a decoding procedure stored in the second memory, so as to obtain the first serial code set.

5. The method of claim 4, wherein the codes in the first serial code set include a start code, a true password code and an end code, and codes in the second serial code set include a start code, a true password code and an end code.

6. The method of claim 4, wherein the codes in the first serial code set further include at least one random code, and codes in the second serial code set further include at least one random code.

7. The method of claim 4, wherein the encoding device further comprises at least one control button, each of which is electrically connected to the first microcontroller unit, and wherein the method further comprises a step of determining if the control button is pressed before the first microcontroller unit reads out the first serial code set.

8. A system for encoding and decoding serial signals formed by a plurality of color lights, comprising:
    an encoding device having a first memory, a first microcontroller unit, a multi-color driving circuit and a multi-color LED, the first memory used for storing at least one first serial code set therein, the first microcontroller unit electrically connected to the first memory for reading out the first serial code set and then generating a control signal corresponding to each of codes in the first serial code set, the multi-color driving circuit electrically connected to the first microcontroller unit for receiving the control signal and generating a driving signal corresponding to the control signal, and the multi-color LED electrically connected to the multi-color driving circuit for receiving the driving signal and generating various color lights having different wavelengths and flash time intervals corresponding to different driving signals; and
    a decoding device having a multi-color sensor, a second memory and a second microcontroller unit; the multi-color sensor used for detecting the color lights emitted by the multi-color LED and generating a detecting signal corresponding to the color lights, the second memory used for storing at least one second serial code set and a decoding procedure therein, the second microcontroller unit electrically connected to the multi-color sensor and the second memory, respectively, for receiving the detecting signal generated by the multi-color sensor and decoding the detecting signal via the decoding procedure stored in the second memory to obtain the first serial code set followed by determining if the first serial code set is identical to the second serial code set stored in the second memory, and in a case that the second microcontroller unit determines that the first serial code set is identical to the second serial code set, the second microcontroller unit sending an actuation signal.

9. The system of claim 8, further comprising an application circuit electrically connected to the second microcontroller unit for receiving the actuation signal generated by the second microcontroller unit and executing a control procedure of an electronic machine or an electric device according to the actuation signal.

10. The system of claim 9, wherein the codes in first serial code set include a start code, a true password code and an end code, and codes in the second serial code set include a start code, a true password code and an end code.

11. The system of claim 9, wherein of the codes in the first serial code set further include at least one random code, and codes in the second serial code set further include at least one random code.

12. The system of claim 9, wherein the encoding device further comprises a power supply unit for supplying an electric power to the first memory, the first microcontroller unit, the multi-color driving circuit and the multi-color LED.

13. The system of claim 12, wherein the encoding device further comprises a control button electrically connected to the power supply unit for switching off or switching on the electric power supplied to the first memory, the first microcontroller unit, the multi-color driving circuit and the multi-color light emitting diode by the power supply unit.

14. The system of claim 9, wherein the encoding device further comprises at least one control button, each of which is electrically connected to the first microcontroller unit for controlling emitting status of the multi-color LED via the first microcontroller unit.

15. The system of claim 9, wherein each of the first memory and the second memory is EEPROM.

\* \* \* \* \*